United States Patent [19]

Suzuki et al.

[11] Patent Number: 5,073,926
[45] Date of Patent: Dec. 17, 1991

[54] PICTURE COMMUNICATION APPARATUS

[75] Inventors: Toshio Suzuki; Hiroshi Sahara; Masashi Tonomura; Yoshihiro Murata; Naoki Fujisaki, all of Kanagawa; Seiji Hattori; Hiroshige Kimura, both of Tokyo, all of Japan

[73] Assignee: ASCH Corporation, Japan

[21] Appl. No.: 464,439

[22] Filed: Jan. 12, 1990

[30] Foreign Application Priority Data

Jan. 20, 1989 [JP] Japan .................................. 1-12388

[51] Int. Cl.$^5$ .............................................. H04N 1/42
[52] U.S. Cl. ........................................ 379/53; 358/85
[58] Field of Search ................. 379/53, 54, 93, 96; 358/85, 134

[56] References Cited

U.S. PATENT DOCUMENTS 3,617,630 11/1971 Reiffel ..................................... 358/93
4,430,526 2/1984 Brown et al. ......................... 379/53
4,650,929 3/1987 Boerger et al. ....................... 358/85
4,893,326 1/1990 Duran et al. ........................... 379/53

Primary Examiner—Jin F. Ng
Assistant Examiner—Stella L. Woo

[57] ABSTRACT

In a two-way communication system having first and second communication terminals, a telephone apparatus at each terminal for two-way telephone service and a picture communication apparatus at each terminal for providing users with visual images of each other; the picture communication apparatus includes video cameras for generating video signals to be transmitted, display apparatus for displaying the visual images, a control apparatus for controlling transmission and reception of the video signals, and a line drawing input apparatus connected to the control apparatus for generating a line signal representing the line drawing and which is transmitted with the video signals from the control apparatus.

6 Claims, 10 Drawing Sheets

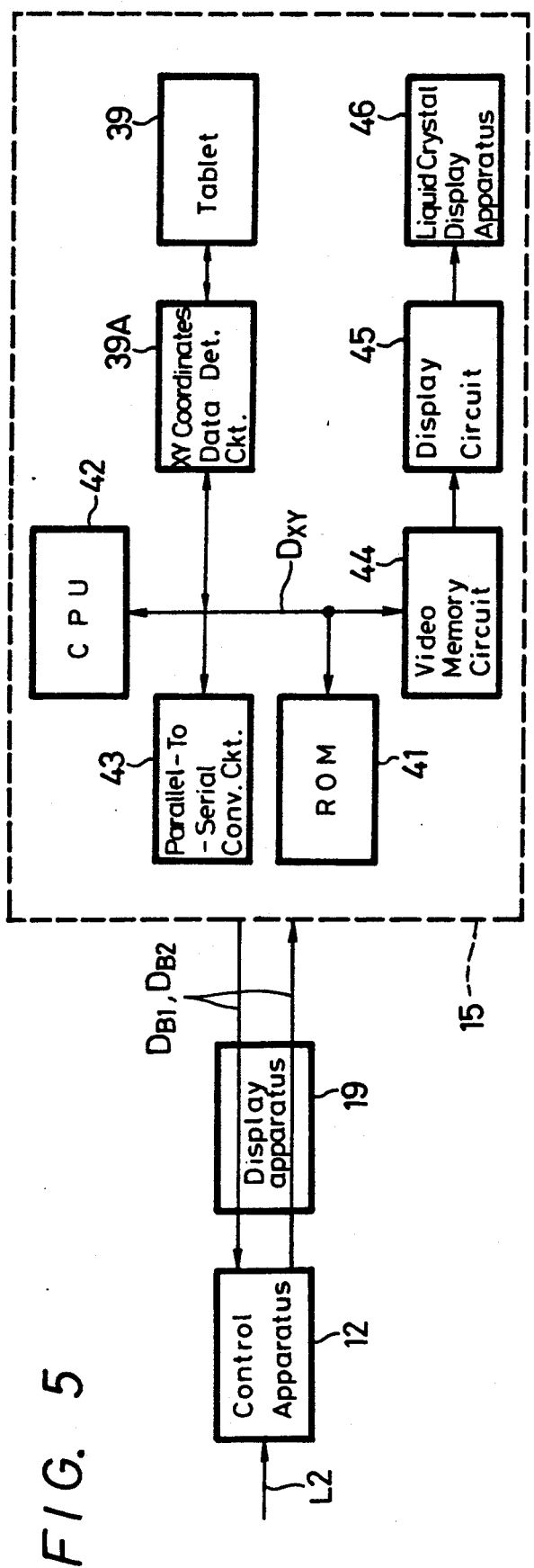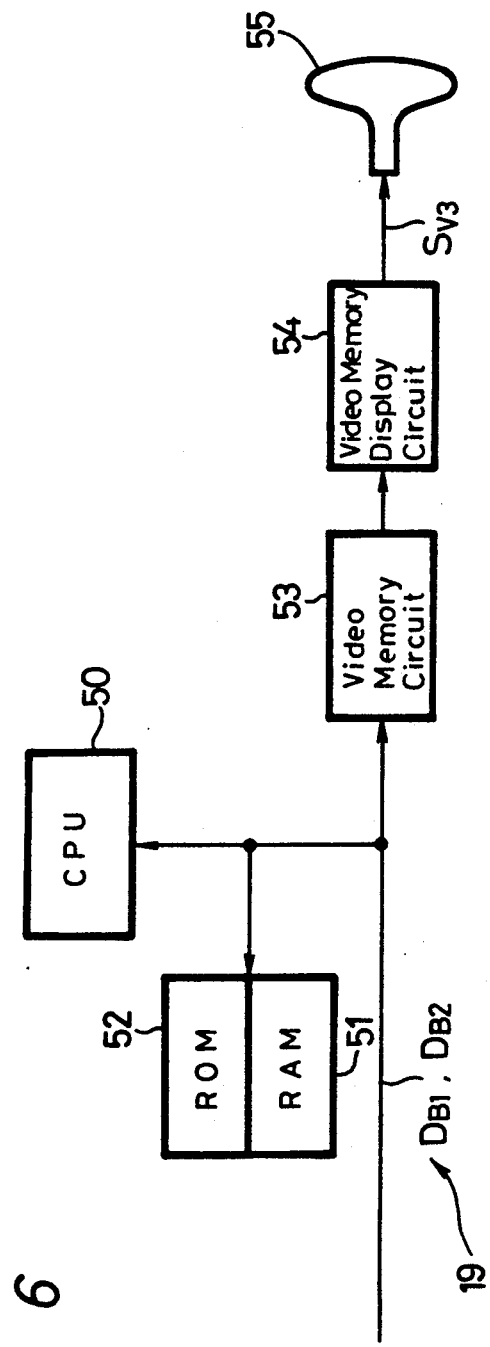
FIG. 5
FIG. 6

PICTURE COMMUNICATION APPARATUS

BACKGROUND OF THE INVENTION

1. Field of the Invention

This invention relates generally to a picture communication apparatus and, more particularly, is directed to a picture communication apparatus having tablet means and which is capable of transmitting line drawing data generated by the tablet means together with video signals.

2. Description of the Prior Art

A picture communication apparatus has thus far been proposed to transmit a picture of the user together with an audio signal through, for example, an exclusive digital network line.

FIG. 1 shows an example of such a previously-proposed picture communication apparatus.

As shown in FIG. 1, in a picture communication apparatus 1, a picture of the user is taken by a camera apparatus 2 to produce a video signal. This video signal is supplied through a control circuit 3 to a data compressing and expanding circuit 4, in which it is compressed and is then transmitted to a transmission receiving apparatus (not shown). Alternatively, a picture of a document selected and positioned by the user is taken by a camera apparatus 5 and this picture is transmitted, instead of the picture of the user. Conversely, a video signal sent from a similar picture communication apparatus is expanded and converted to a video signal in the circuit 4. This converted video signal is then displayed on a predetermined display apparatus 6. Therefore, the users of two stations, each having a picture communication apparatus 1, can communicate with each other as though they were meeting in person while discussing drawings or the like.

Further, if the picture communication apparatus is combined with a tele-writing apparatus so that a line drawing inputted by a user terminal apparatus, for example, is independently transmitted to a transmission receiving apparatus, it becomes possible for the users to exchange their views while discussing drawings and the like between distant stations.

In the above-described picture communication apparatus, if a line drawing signal is added to the document signal and transmitted therewith, the picture communication apparatus can be utilized more effectively.

OBJECTS AND SUMMARY OF THE INVENTION

Accordingly, it is an object of the present invention to provide an improved picture communication apparatus which is free from the drawbacks encountered with the prior art apparatus.

More specifically, it is an object of the present invention to provide an improved picture communication apparatus capable of transmitting line drawing data together with video signals generated by cameras.

It is another object of the present invention to provide an improved picture communication apparatus having a display device on which a line drawing is displayed immediately after the line drawing data are inputted.

It is a further object of the present invention to provide an improved picture communication apparatus having a display device on which a superimposed image of the line drawing and the image represented by video signals generated by a camera are displayed.

According to an aspect of the present invention, in a two-way communication system having first and second communication terminals, telephone means at each terminal for two-way telephone service and picture communication means at each terminal for providing users with visual images of each other, said picture communication means comprises:

(a) camera means for generating video signals to be transmitted;

(b) display means for displaying the visual images;

(c) control means for controlling transmission and reception of said video signals; and (d) line drawing input means connected to said control means for generating a line signal representing said line drawing, whereby said line signal is transmitted with said video signals from said control means.

The above, and other objects, features and advantages of the present invention will become apparent in the following detailed description of preferred embodiments when read in conjunction with the accompanying drawings, in which like reference numerals are used to identify the same or similar parts in the several views.

BRIEF DESCRIPTION OF THE DRAWINGS

FIG. 5 is a block diagram of tablet means used in the apparatus of FIG. 2;

FIG. 6 is a block diagram of display means used in the apparatus of FIG. 2;

DETAILED DESCRIPTION OF PREFERRED EMBODIMENTS

Figure 1:
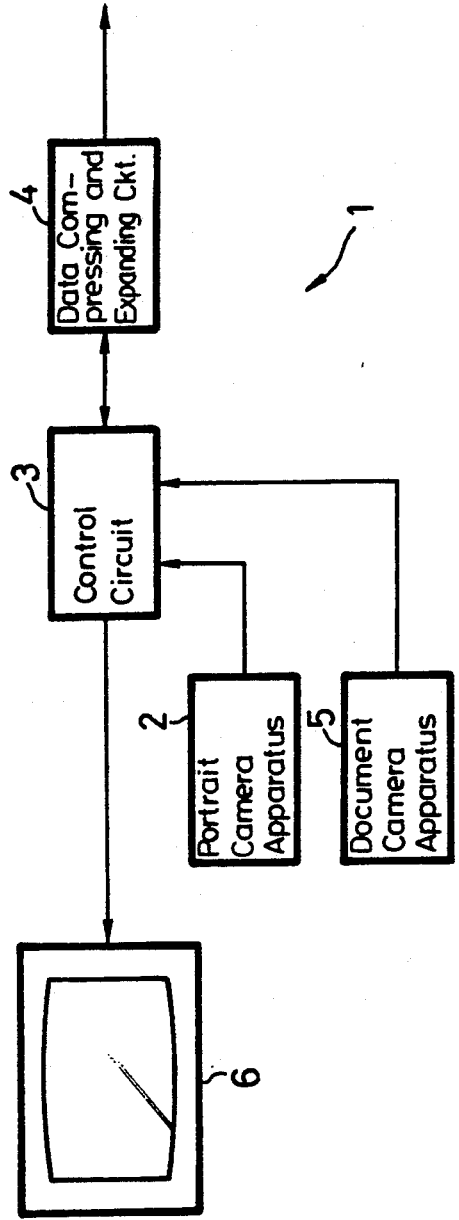
FIG. 1 is a block diagram of a prior-art picture communication terminal used in a two-way communication system.
Figure 2:
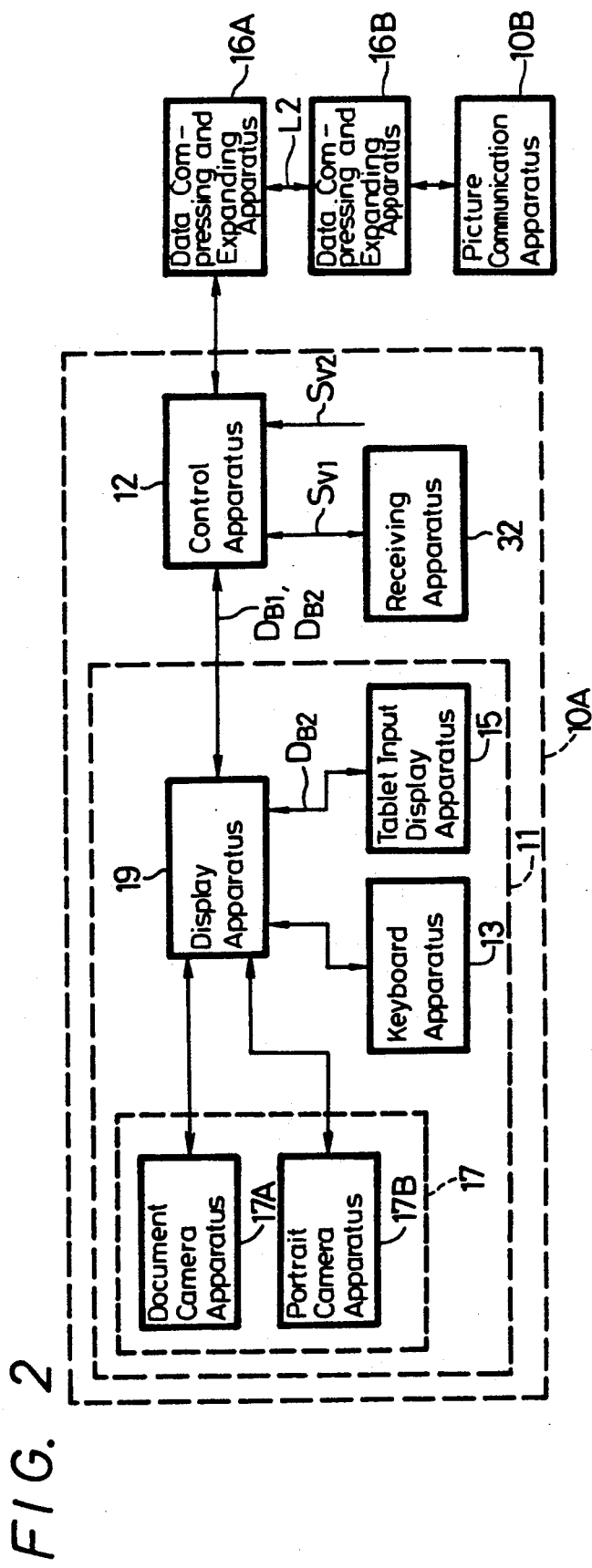
FIG. 2 is a block diagram of a two-way communication system according to an embodiment of this invention.

Referring to the drawings in detail, and initially to FIG. 2, it will be seen that a picture communication apparatus 10A is comprised of a user terminal apparatus 11 and a control apparatus 12 which are shown to be located separately from each other.

In the illustrated user terminal apparatus 11, there are included a keyboard apparatus 13, a tablet input display apparatus 15 and a camera apparatus 17 connected to the control apparatus 12 through a display apparatus 19, whereby the connection between the keyboard apparatus 13, the tablet input display apparatus 15, the camera apparatus 17, the display apparatus 19 and the control apparatus 12 can be simplified. Therefore, the operator or user can set up the picture communication apparatus 10A with ease merely by connecting the user terminal apparatus 11, placed on the user's desk top, to the control apparatus 12.

Figure 3:
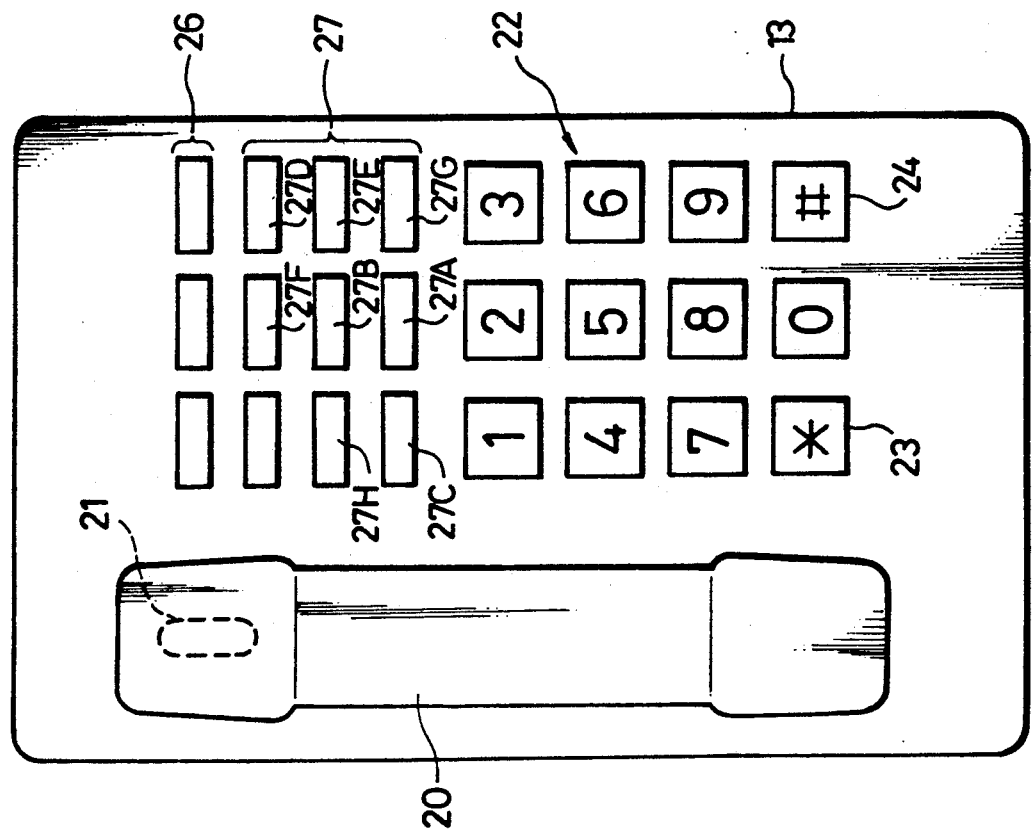
FIG. 3 is a plan view of a key-board of the apparatus of FIG. 2.

As shown in FIG. 3, the keyboard apparatus 13 is provided with a handset 20, an ON-hook switch 2,, a dial keypad 22 having dial keys "0" to "9", a "*" key 23, a "#" key 24, a key 26 for abbreviated dialing, reserve and the like, and mode switching keys 27. If switches associated with these keys are sequentially scanned at a predetermined cycle, then it becomes possible to detect the ON-state of each key.

Further, when selected keys of the keyboard apparatus 13 are turned ON, the keyboard apparatus 13 supplies key codes assigned to the respective keys to the control apparatus 12, thereby effecting a communication between the picture communication apparatus and a desired transmission receiving apparatus.

The control apparatus 12 is adapted to detect the key code derived from the keyboard apparatus 13. On the basis of the key code detected, the control apparatus 12 changes the operation mode of the picture communication apparatus 10A.

More specifically, the control apparatus 12 controls the picture communication apparatus 10A so that the latter is set in a local mode when either of two mode change-over keys 27A (television signal receiving mode) and 27B (video tape recorder reproducing mode) is operated.

Accordingly, when the mode change-over key 27A for the television signal receiving mode is turned ON, the control apparatus 12 responds to the operations of the keys of the dial keypad 22 and the "#" key 24 to change a receiving channel of a receiving apparatus 32 connected thereto. A video signal $S_{V1}$ and an audio signal delivered from the receiving apparatus 32 are supplied through the control apparatus 12 to the display apparatus 19.

Thus, when the keys of the dial keypad 22 and the key 24 are sequentially operated in the order of "1", "0" and "#", the receiving channel is changed to channel 10, thereby receiving a television signal of channel 10. Accordingly, the dial keys of the dial keypad 22 can be activated for switching the channel, thereby simplifying the arrangement of the keyboard apparatus 13.

Alternatively, when the mode change-over key 27B for the video tape recorder reproducing mode is turned ON, a video signal $S_{V2}$ and an audio signal from a video tape recorder (not shown) connected to the control apparatus 12 are supplied through the control apparatus 12 to the display apparatus 19, whereby the picture communication apparatus 10A can be utilized as a monitor apparatus for the video tape recorder. Therefore, the picture communication apparatus 10A can be utilized as the television receiver and the monitor apparatus, which enables the user to utilize the picture communication apparatus 10A more effectively.

When a key 27C of the mode change-over keys 27 is turned ON for selecting the picture communication mode, the control apparatus 12 controls the picture communication apparatus 10 and sets it in the picture communication mode. Then, the control apparatus 12 detects the states of the keys 22 to 24 and supplies a command to a data compressing and expanding apparatus 16A, thereby effecting the circuit connection processing. Thus, the picture communication apparatus 10 is connected through an exclusive digital network line L2 to a picture communication apparatus 10B of a desired transmission receiving apparatus, for example, at a remote station.

Instead of utilizing the picture communication mode key 27C, the ON-hook switch 21 in the control apparatus 12 may be turned OFF, for similarly placing the picture communication apparatus 10 in the picture communication mode, and the picture communication apparatus 10 is connected to the digital network line L2.

When a picture pick-up key 27D of the mode change-over keys 27 is turned ON, a picture of a document selected, by the user, is taken by a document camera apparatus 17A, and the control apparatus 12 is supplied with the resultant video signal from the display apparatus 19.

The control apparatus 12 supplies this video signal and an audio signal from the handset 20 to the succeeding data compressing and expanding apparatus 16A. In the data compressing and expanding apparatus 16A associated with the picture communication apparatus 10A, these video and audio signals are converted to digital signals. The digital video and audio signals are then compressed into a digital signal which is transmitted through the exclusive digital network line L2 to a transmission receiving apparatus, for example, a picture communication apparatus 10B through an associated data comprising and expanding apparatus 16B.

An input digital signal supplied to the picture communication apparatus 10A through the exclusive digital network line L2 for example, from the picture communication apparatus 10B, is expanded into data by the data compressing and expanding apparatus 16A, whereby it is converted into video and audio signals. These video and audio signals are supplied to the tablet input display apparatus 15. Thus, the user of the picture communication apparatus 10A can discuss the same picture with the user of the picture communication apparatus 10B, which is connected to the former via the exclusive digital network line L2.

When a key 27E of the mode change-over keys 27 is turned ON, the control apparatus 12 controls the camera apparatus 17 so that the latter is changed from the document camera apparatus 17A to the portrait camera apparatus 17B, whereby a picture is taken of the user who is seated in front of the display apparatus 19. Therefore, the video signal represents an image of the user, instead of the document, is supplied to the control apparatus 12 via the display apparatus 19. This video signal, and an audio signal from the handset 20 are converted to digital signals, which are compressed and then transmitted to the transmission receiving apparatus.

Accordingly, in the above-described operation mode, the display apparatus 19 and the picture communication apparatus 10B, shown in FIG. 2 as the transmission receiving apparatus, can display the pictures of the users to each other, whereby the users can communicate with each other as though they were meeting in person.

Further, when a still picture mode key 27F of the keys 27 is turned ON, the video signal issuing from the display apparatus 19 at that time is supplied to the control apparatus 12. This video signal is converted to a digital signal of a predetermined format by the data compressing and expanding apparatus 16A, and is transmitted together with an audio signal. Therefore, the picture of the document or portrait taken by the camera apparatus 17 is converted to a still picture, and a high resolution image can be transmitted.

When a cursor key 27G of the keys 27 is turned ON, the picture communication apparatus 10A is set in the tele-writing mode, whereby the video signals, audio signals and line drawing data $D_{B2}$ supplied by the tablet input display apparatus 15 are transmitted to the transmission receiving apparatus.

Further, the control apparatus 12 receives the video signal, audio signal and picture drawing data $D_{B1}$ transmitted from the transmission receiving apparatus and then supplies them to the display apparatus 19 and the tablet input display apparatus 15.

Figure 4:
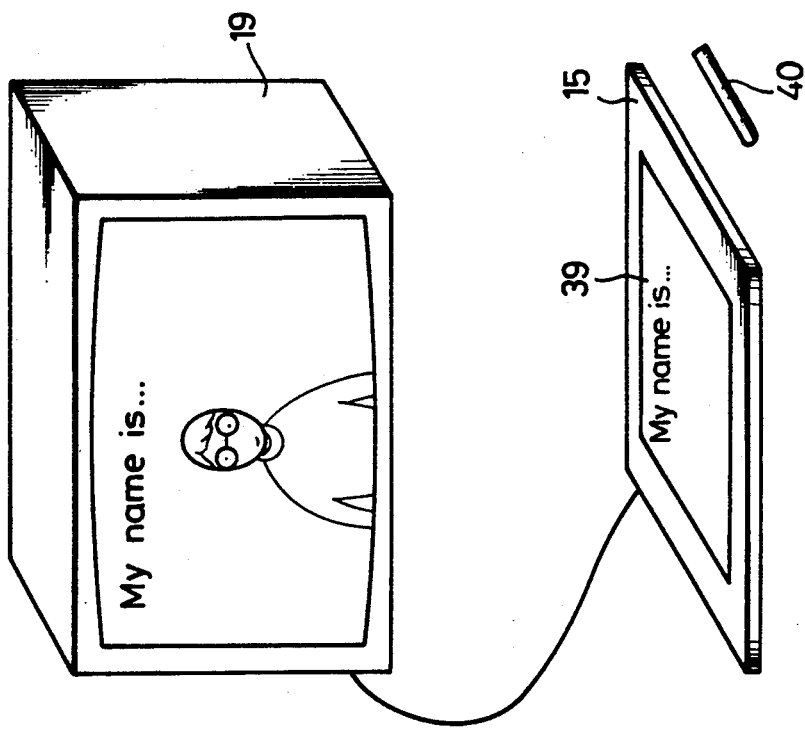
FIG. 4 is a pictorial representation to which reference will be made in explaining the connection between display means and tablet means.

Accordingly, in that event, when a superimpose key 27H of the keys 27 is turned ON, the control apparatus 12 supplies a control signal to the display apparatus 19 so that the display condition on the latter is changed-over to the superimpose display, as shown in FIG. 4.

Referring now to FIG. 5, the tablet input display apparatus I is there shown to utilize a liquid crystal display apparatus 46 to display line drawings. Electrodes bonded to the rear surface of the liquid crystal display apparatus 46 form a tablet 39.

Further, in the tele-writing mode, the tablet input display apparatus 15 displays input menu data, such as a straight line, a circle, hand-written data and the like, on the display screen of the liquid crystal display apparatus 46. When the user presses a stylus 40 (see FIG. 4) on the display screen of the liquid crystal display apparatus 46, the tablet input display apparatus 15 is placed in a predetermined input mode.

More specifically, in the tablet input display apparatus 15, the tablet 39 is divided into 640 by 480 very small areas in the horizontal and vertical directions, respectively. When the very small areas of the tablet 39 are scanned by an xy coordinates data detecting circuit 39A in a predetermined cycle, the coordinates data $D_{xy}$ of the very small areas pressed by the stylus 40 are detected, with such coordinates data $D_{xy}$ having a predetermined original point 0 on the tablet 39.

Further, in the tablet input display apparatus 15, the coordinates $D_{xy}$ are processed by a central processing unit (CPU) 42 in accordance with a processing program stored in a read only memory (ROM) 41, whereby the input mode is changed to a predetermined line drawing input mode.

Thereafter, when the input mode is changed to, for example, a straight line input mode, menu data (such as, the display color, the width of the line, and the like,) selected on the display screen of the liquid crystal display apparatus 46 by the user are processed in a manner similar to that described above. Then, coordinates data expressing a straight line are obtained from the coordinates data of the successive very small area which are pressed by the stylus 40, thereby forming the picture drawing data $D_{B2}$.

More specifically, the coordinates data $D_{XY}$ of the very small areas pressed by the stylus 40 are sequentially obtained from the xy coordinates data detecting circuit 39A in accordance with the processing program stored in the read only memory 41. Thus, the coordinates data $D_{XY}$ representing the starting portion and ending portion of the straight line can be detected.

Line drawing data expressing a straight line and control data expressing the width and display color of the straight line are added to the coordinates data $D_{XY}$, which represent the starting point and the ending point of the straight line, to form a line drawing data $D_{B2}$ set. This line drawing data $D_{B2}$ set is referred to as a picture description instruction (PDI) set.

In the tablet input display apparatus 15, the line drawing data $D_{B2}$ are converted from parallel to serial data by a parallel-to-serial converting circuit 43. The converted serial line drawing data $D_{B2}$ are supplied through the display apparatus 19 to the control apparatus 12 on the basis of regulations of the Federal Communications Commission, for example, RS-232C. Simultaneously, display data stored in a video memory circuit 44 are renewed on the basis of the line drawing data $D_{B2}$.

When the input mode is changed to the hand-written data input mode, for example, coordinates data $D_{XY}$ are sequentially obtained for the locus points drawn by the stylus 40 during the detection cycle of the xy coordinates data detecting circuit 39A. The picture drawing data $D_{B2}$ connecting the above-mentioned points are obtained on the basis of the coordinates data $D_{XY}$.

Accordingly, the picture drawing data $D_{B2}$ are sequentially outputted, and this data forms the basis of the display image of the locus, which has been drawn by the stylus 40. Thus, display data in the video memory 44 are sequentially read by the display circuit 45, and on the basis of the display data, the line drawing is displayed on the liquid crystal display apparatus 46. Thus, in the hand-written data input mode, the display circuit 45 displays the line drawing in accordance with the locus of the stylus 40. In this embodiment, the tablet input display apparatus 15 forms the line drawing input means which inputs line drawing data.

Further, the picture drawing data $D_{B1}$ of the transmission receiving apparatus, outputted from the control apparatus 12, are supplied to the tablet input display apparatus 15. The tablet input display apparatus 15 processes the picture drawing data $D_{B1}$ in a manner similar to that of the picture drawing data $D_{B2}$, thereby displaying the line drawing expressed by the picture drawing data $D_{B1}$ together with the line drawing expressed by the line drawing data $D_{B2}$. Therefore, the tablet input display apparatus 15 can display the line drawing while it is simultaneously displayed in the transmission receiving apparatus. Thus, it is possible to realize the tele-writing function where the user and the other party can draw pictures to each other on a sheet of paper. Consequently, the picture communication apparatus can be utilized more effectively.

As described above, the CPU 42 outputs the picture drawing data $D_{B2}$ to the control apparatus 12, in accordance with the regulations RS-232C set by the Federal Communications Commission, so that the control apparatus 12 does not need to convert the coordinates data $D_{XY}$ into the picture drawing data. Therefore, this embodiment makes it possible to more effectively avoid lowering the processing speed of the video signal, for example. Thus, the picture communication apparatus of the present invention can be utilized more effectively.

Referring back to FIG. 2, the display apparatus 19 is adapted to display the video signal, which is supplied by the control apparatus 12, in response to the mode switching operation of the latter. More specifically, in the local mode and in the television communication mode, the display apparatus 19 displays the picture corresponding to the video signal supplied by the control apparatus 12, whereas in the tele-writing mode, the display apparatus 19 forms and displays visual images in response to the picture drawing data $D_{B1}$ and $D_{B2}$ supplied by the control apparatus 12 and the tablet input display apparatus 15.

As shown in FIG. 6, the display apparatus 19 is alternately and sequentially supplied with the picture drawing data $D_{B1}$ and $D_{B2}$, which are outputted from the tablet input display apparatus 15 and the control apparatus 12, and the display apparatus 19 supplies the data to its random access memory (RAM) circuit 51 to be stored therein.

Simultaneously, the central processing unit (CPU) 50 of the display apparatus 19 processes the picture drawing data $D_{B1}$ and $D_{B2}$ in accordance with the processing program stored in a read only memory circuit (ROM) 52, whereby the display data stored in a video memory circuit 53 are renewed on the basis of the picture drawing data $D_{B1}$ and $D_{B2}$.

Further, as shown in FIG. 6, a video memory display circuit 54 sequentially reads the display data of the video memory circuit 53 in order to form a video signal $S_{V3}$, and then displays an image of the video signal $S_{V3}$ on a cathode ray tube (CRT) 55.

Therefore, the display apparatus 19 can display the line drawing inputted at the same time as the image from the transmission receiving apparatus thereby realizing the tele-writing function in which the user can draw line drawings on a sheet of paper at the same time as the other party. Thus, the picture communication apparatus of the present invention can be utilized more effectively than that of the prior art.

Further, in response to the control signal from the control apparatus 12, the display apparatus 19 is adapted to display the video signal $S_{V3}$ in a superimposed fashion upon the video signal supplied by the control apparatus 12. Thus, the picture communication apparatus 10 can be utilized more effectively.

More specifically, the display apparatus 19 forms a key signal on the basis of the video signal $S_{V3}$ generated from the picture drawing data $D_{B1}$ and $D_{B2}$, whereby on the basis of this key signal, a line drawing can be superimposed upon the displayed image of the video signal derived from the control apparatus 12. Therefore, with the picture communication apparatus 10, the line drawing or the like can be superimposed upon the picture that is transmitted. For example, while displaying the transmitted image, such as a map or the like, a line drawing, such as a route or the like, can be inputted to the displayed image. Further, a drawing sheet, instead of a map, can be displayed, whereby errors on the drawing sheet can be pointed out or the drawing sheet can be re-written. Thus, the picture communication apparatus of this invention can be utilized more effectively.

With the above-mentioned arrangement, when either the television signal receiving mode change-over key 27A or the video tape recorder reproducing mode change-over key 27B is turned ON, the picture communication apparatus 10A is set in the television receiver mode or the monitor apparatus mode, whereby the reproduced picture of the television broadcast or the video tape recorder is displayed on the display apparatus 19.

When either the picture communication mode key 27C is turned ON or the handset 20 is ON-hooked, the picture communication apparatus 10A embodying the invention is connected to the picture communication apparatus 10B of the transmission receiving apparatus through the exclusive digital network line L2.

In this state, if the picture pick-up key 27D is turned ON, a picture of a document selected and positioned by the user of the apparatus 10B is taken by the respective document camera apparatus 17A, and the resultant video signal is transmitted together with the audio signal from the apparatus 10B. The video signal and the audio signal are inputted to the apparatus 10A through the exclusive digital network line L2 and are supplied to the respective display apparatus 19. Thus, this arrangement makes it possible for the operator of the picture communication apparatus 10A to communicate with the operator of the picture communication apparatus 10B while discussing the same document with each other.

When the portrait camera key 27E is turned ON, the video signal represents the portrait of the user, instead of the document, and is transmitted to the transmission receiving apparatus, whereby the users can communicate with each other as though they were meeting in person.

Further, when the still picture mode key 27F is turned ON, a still video signal of the operator or document is transmitted.

When the cursor operation key 27G is turned ON, the mode of the picture communication apparatus is set in the tele-writing mode, whereby the picture drawing data $D_{B2}$ supplied by the tablet input display apparatus 15 are transmitted to the transmission receiving apparatus, and are supplied to the display apparatus 19 together with the picture drawing data $D_{B1}$ transmitted from the transmission receiving apparatus. When the superimpose key 27H is turned ON, the picture corresponding to the video signal transmitted from the transmission receiving apparatus is displayed and the line drawing is superimposed upon this picture.

Another embodiment of the invention will now be described with reference to FIG. 7 in which line drawing information is displayed on the liquid crystal display apparatus which is integrated with the tablet so that the displayed line drawing is superimposed upon the picture corresponding to the video signal from the control apparatus 12.

Figure 7:
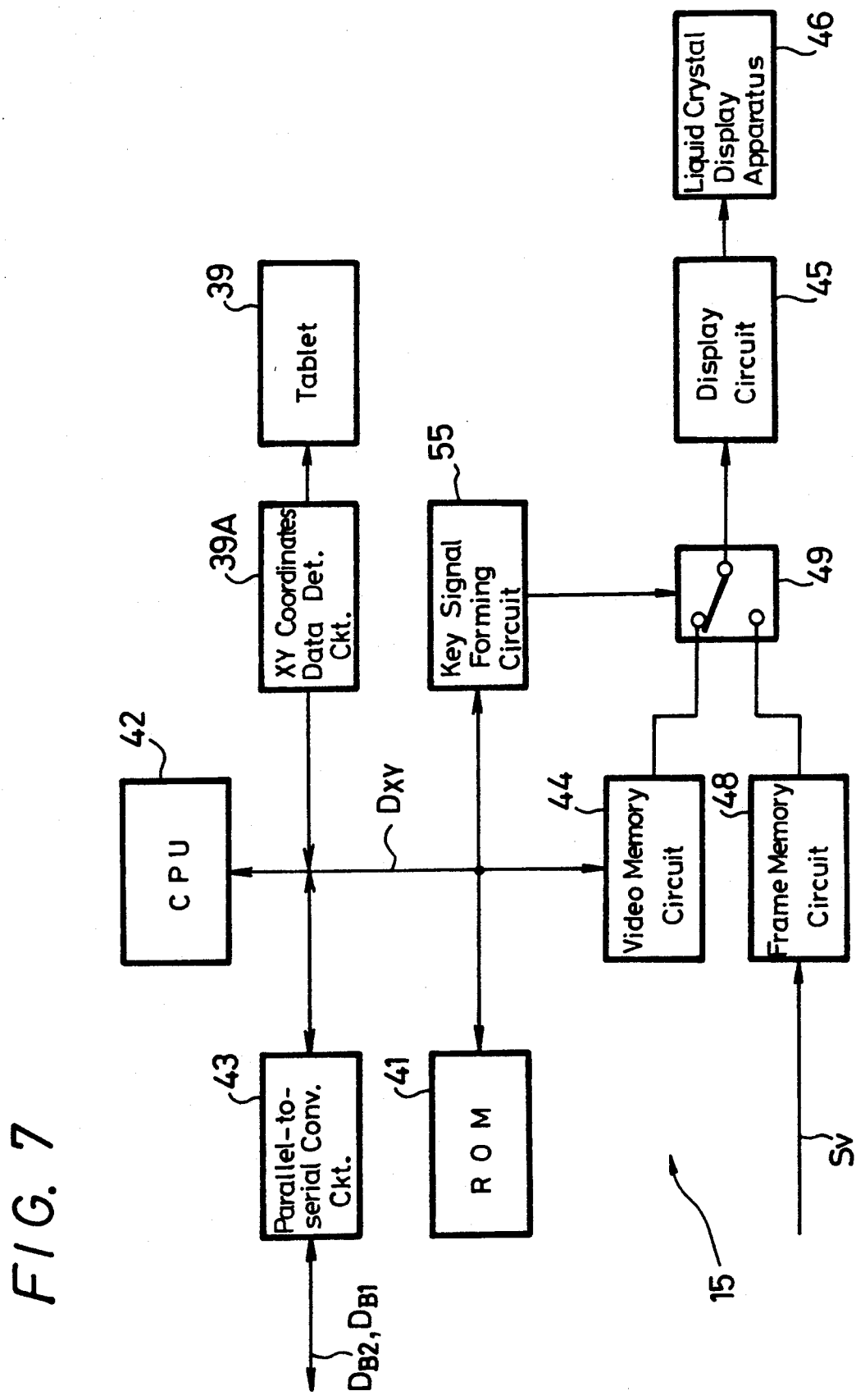
FIG. 7 is a block diagram of another example of tablet means used in the apparatus of FIG. 2.

As shown in FIG. 7, the tablet input display apparatus 15 displays the video signal and the line drawing on the display screen of the liquid crystal display apparatus 46 which has the tablet 39 formed by electrodes bonded to the rear surface of the above-described display screen.

More specifically, the tablet input display apparatus 15 changes its operation mode in response to the mode change-over operation of the control apparatus 12. In the local mode and the television communication mode, the video signal $S_V$ from the control apparatus 12 is sequentially written in a frame memory circuit 48, and is sequentially read by a display circuit 45, via a selecting circuit 49. Thus, the visual image of the above-mentioned video signal $S_V$ is displayed on the display screen of the liquid crystal display apparatus 46.

In the tele-writing mode of the embodiment of FIG. 7, the tablet input display apparatus 15 forms a visual image in response to the picture drawing data $D_{B1}$ inputted thereto from the control apparatus 12 and the picture drawing data $D_{B2}$ supplied by the tablet input display apparatus 15. This visual display image is superimposed upon the display image of the video signal $S_V$.

The arrangement by which the display data stored in the video memory circuit 44 are renewed with respect to the coordinates data generated by the tablet 39 is similar to that described in connection with FIG. 5. In FIG. 7, parts corresponding to those of FIG. 5 are marked with the same references and therefore will not be described in detail. Accordingly, the line drawing data $D_{B2}$ of the straight line, for example, are sequentially outputted, and a display image of the scanning locus of the stylus 40 is formed on the basis of the line drawing data $D_{B2}$ of the straight line. As described above, the display circuit 45 sequentially reads the display data of the video memory circuit 44 via the selecting circuit 49, whereby a line drawing, expressed by the line drawing data $D_{B2}$, can be displayed on the display screen of the liquid crystal display apparatus 46. Consequently, in the hand-writing input mode, for example, the line drawing can be displayed following the locus which is hand-written by using the stylus 40. Therefore, one operator can operate the stylus 40 while viewing the displayed line drawing, and both operators can input data with ease as though they were inputting line drawing data by using a writing utensil.

In the embodiment shown in FIG. 7, a key signal forming circuit 55 forms a key signal on the basis of the line drawing data $D_{B2}$. This key signal is supplied to the selecting circuit 49, whereby the line drawing portion of the video signal $S_V$ is extracted and is replaced by the display data of the video memory circuit 44. Thus, the image of the line drawing data is superimposed upon the displayed image of the video signal $S_V$.

Therefore, in the simplified arrangement in which the tablet input display apparatus 15 is utilized with the display apparatus 19, pictures of maps, drawings and the like, for example, are taken by the camera apparatus 17 and line drawing data can be superimposed upon the displayed picture and then transmitted. Thus, the picture communication apparatus according to the invention can be utilized more effectively than that of the prior art.

Further, in addition to receiving the picture drawing data $D_{B2}$, the tablet input display apparatus 15 receives the picture drawing data $D_{B1}$ sent from the transmission receiving apparatus and it processes the picture drawing data $D_{B1}$ in a manner similar to that of the picture drawing data $D_{B2}$. Hence, the line drawing data expressed by the picture drawing data $D_{B1}$ are displayed together with the line drawing data expressed by the picture drawing data $D_{B2}$. Thus, the tablet input display apparatus 15 can display the line drawing data which are simultaneously displayed on the transmission receiving apparatus.

Accordingly, it is possible to realize the tele-writing function in which a user can draw a line drawing on a sheet of paper and the same line drawing can be simultaneously displayed on the transmission receiving apparatus. Consequently, the picture communication apparatus can be utilized more effectively than the prior-art picture communication apparatus.

In this embodiment, the tablet input display apparatus 15 is provided with input display means which displays line drawing data on the display screen and which displays picture drawing data on the input screen.

A further embodiment of the invention will now be described with reference to FIG. 8 in which coordinates data detected when a line is traced on the tablet by the stylus are converted to relative coordinates data and are then transmitted.

Figure 8:
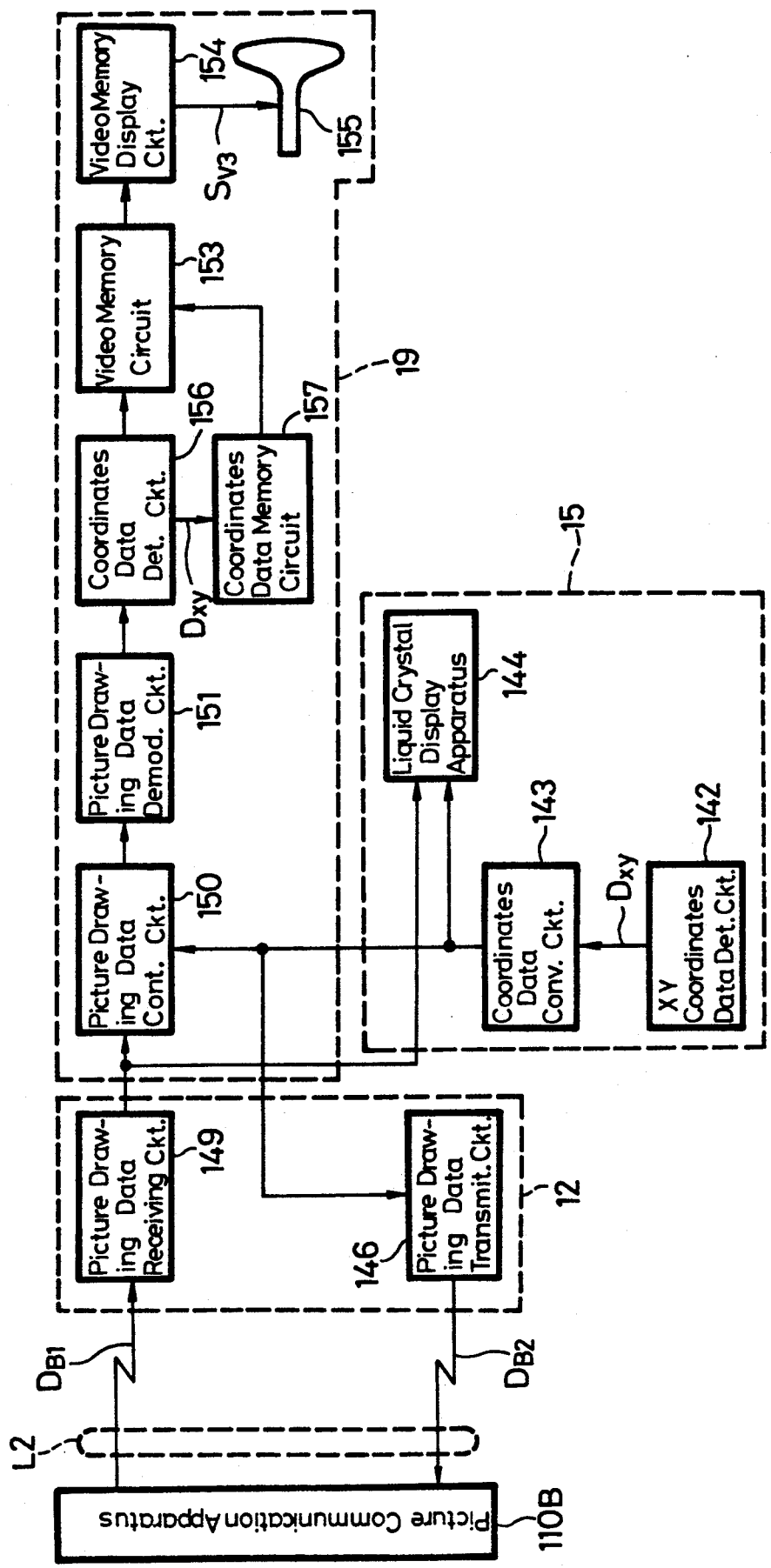
FIG. 8 is a block diagram of the two-way communication system according to another embodiment of this invention.

As shown in FIG. 8, when a line drawing is drawn by depressing the stylus 40 (see FIG. 4) on the liquid crystal display screen, an XY coordinates data detecting circuit 142 is adapted to scan the display screen and detect the very small areas pressed by the stylus 40. Thus, the line drawing data can be detected by the coordinates data of the very small areas.

Accordingly, in this embodiment, the tablet 39, the stylus 40 (see FIG. 4) and the XY coordinates data detecting circuit 142 constitute coordinates data input means which input the coordinates data of the locus drawn by the stylus 40.

Figure 9:
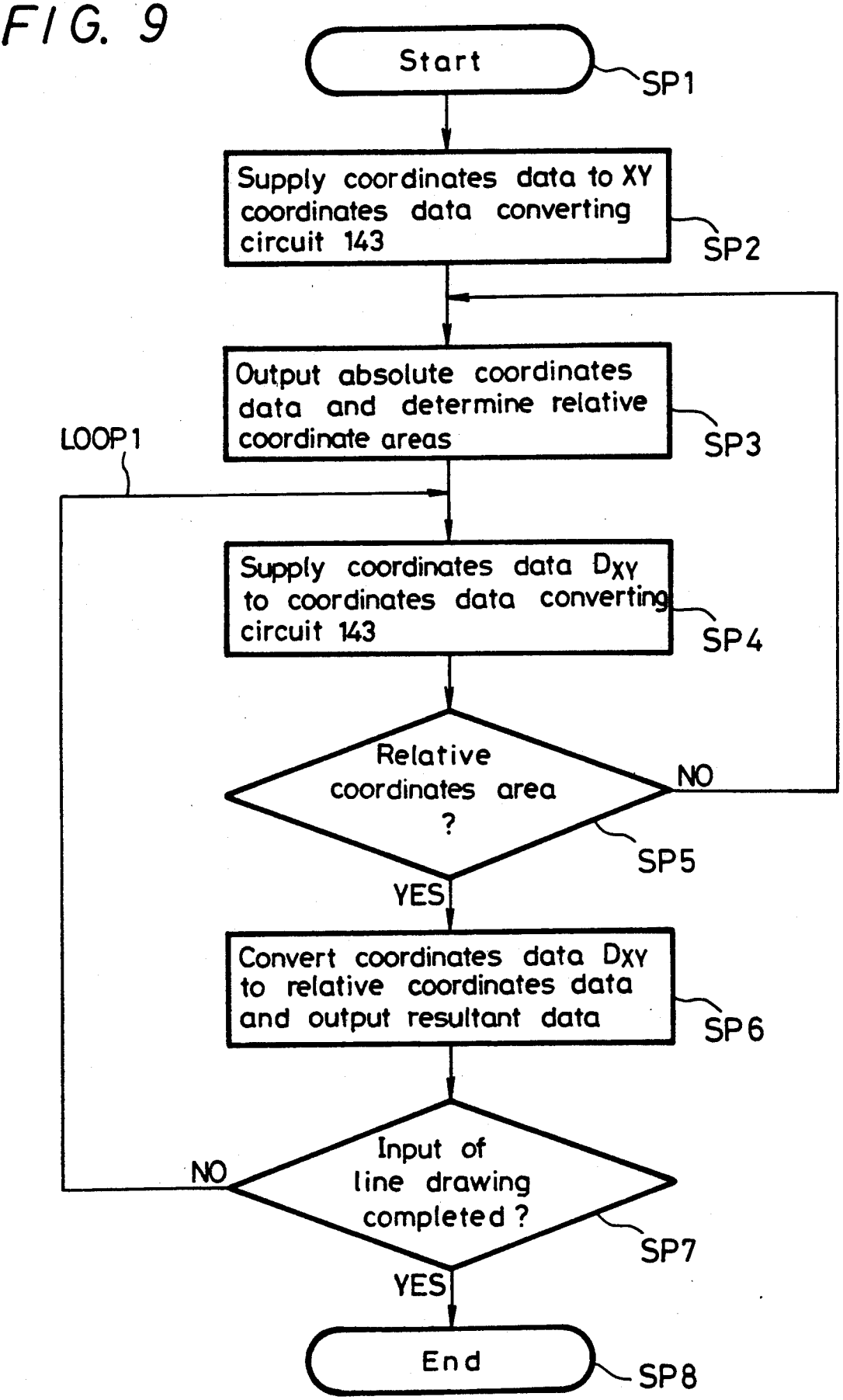
FIG. 9 is a flow chart to which reference will be made in explaining the operation of tablet means of the apparatus of FIG. 8.

A coordinates data converting circuit 143, which may be comprised of a suitable central processing unit (CPU), is operative, when the input of the line drawing data is begun in the line drawing data input mode, to execute the routine of FIG. 9, for converting the coordinates data into picture drawing data $D_{B2}$ of predetermined format.

Referring to FIG. 9, following the Start of the operation at start step SP1, the processing moves to step SP2 wherein the coordinates data $D_{XY}$ of the very small area initially pressed by the stylus 40 (see FIG. 4) are supplied from the XY coordinates data detecting circuit 142 to the XY coordinates data converting circuit 143. Then, the processing proceeds to step SP3, in which an operation code, representing a point, is attached to the starting portion of the coordinates data $D_{XY}$, and is then outputted.

Figure 10:
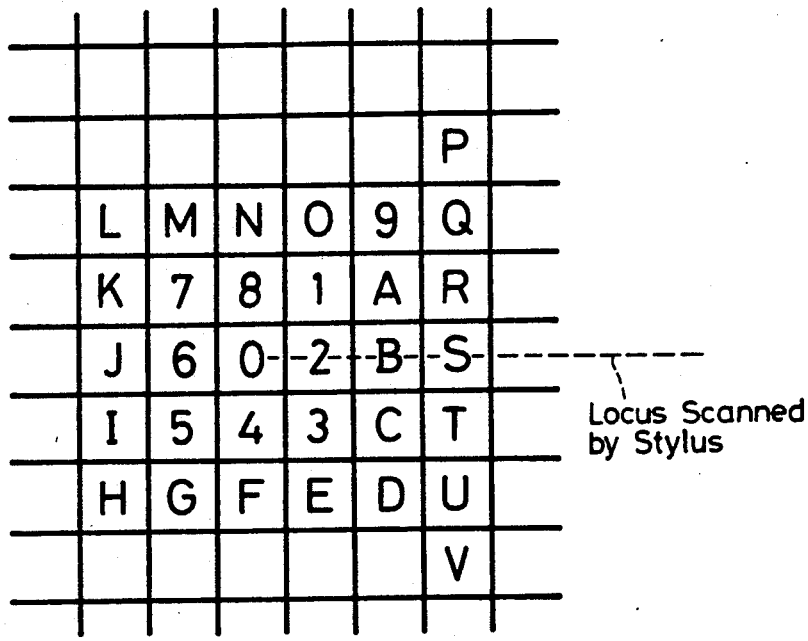
FIGS. 10 and 11 are schematic diagrams for explaining the operation of the apparatus of FIG. 8.

Further, as shown in FIG. 10, the very small area, pressed by the stylus 40, is determined as a picture drawing starting point, and the picture drawing starting point is assigned a relative coordinate value 0. Furthermore, in the step SP3, coordinates (hereinafter referred to as relative coordinates) of hexadecimal notation, which increment by 1 each, are assigned to 15 very small areas (hereinafter referred to as relative coordinate areas) which are arranged in succession in a spiral manner around the above-described drawing starting point.

Then, the processing by the coordinates data converting circuit 143 proceeds to step SP4, whereat the coordinates data converting circuit 143 is supplied with the coordinates data $D_{XY}$ inputted from the XY coordinates data detecting circuit 142 as drawing with the stylus 40 proceeds. The processing proceeds to step SP5, in which it is determined whether or not the very small area then expressed by the coordinates data $D_{XY}$ is one of the previously assigned relative coordinates areas.

Accordingly, if the stylus 40 is moved from the drawing starting point to the area in which the coordinate value 2 (FIG. 10) is assigned, then a YES is outputted at step SP5. Then, the processing by the coordinates data converting circuit 143 proceeds to step SP6, wherein the coordinates data $D_{XY}$ are converted to the relative coordinates data based on the drawing starting point. Thus, the coordinates data $D_{XY}$ are converted to the relative coordinates data (in this case, the value thereof is 2) comprised of 8 bits, and then outputted.

The processing by the coordinates data converting circuit 143 proceeds to step SP7, wherein it is determined whether or not the input of the line drawing is completed. If a NO is outputted at step SP7, then the processing returns to step SP4, wherein the next coordinates data $D_{XY}$ are supplied to the coordinates data converting circuit 143.

Therefore, in the coordinates data converting circuit 143, if the processing loop LOOP1, comprised of steps SP4, SP5, SP6 and SP7, is repeatedly executed, while movement of the stylus 40 is in the lateral direction from the drawing starting point 0 on FIG. 10, relative coordinates having the values 2, B, S, ... are sequentially converted to data of 8 bits and outputted.

Figure 11:
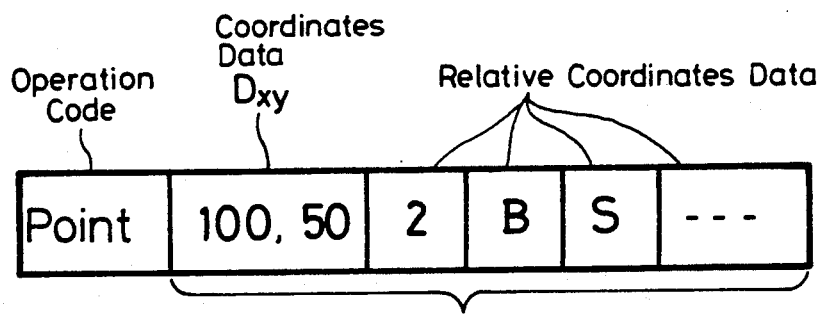

Accordingly, as shown in FIG. 11, in the coordinates data converting circuit 143, the operation code representing the starting point for the hand-written input of the line drawing is transmitted first. Next, the absolute coordinates data $D_{XY}$ of the starting point and the relative coordinates data based on the coordinates data $D_{XY}$ are sequentially outputted. Therefore, unlike the prior art, the operation codes, each representing a point, need not be added to the absolute coordinates of the plurality of points, so that it is possible to reduce the amount of picture drawing data used to express a line drawing.

The coordinates of the succeeding points are expressed by the relative coordinates based on the coordinates data $D_{XY}$ of the picture drawing starting point, whereby data amounts of 4 to 6 bytes, necessary for transmitting coordinates of succeeding respective points in the prior art, can be reduced to a data amount of 8 bits, thereby reducing the data amount of line drawing data which are used to express the line drawing. Consequently, the processing speed of the display apparatus 19 can be increased, and the network line can be utilized more efficiently.

If the movement of the stylus 40 departs from the relative coordinates area, a NO is outputted at step SP5 on FIG. 9, and the processing by the coordinates data converting circuit 143 returns to step SP3. At step SP3, the picture drawing starting point is set in a new very small area from which the stylus 40 is to be displaced, and the relative coordinates region is reset to extend around this picture drawing starting point.

Thus, the drawing start point and the relative coordinates area are reset so that after the operation code and the absolute coordinates data $D_{XY}$ are outputted again, the processing loop LOOP1 is repeated.

Therefore, the picture drawing data $D_{B2}$ are formed in units of relative coordinates regions, and new picture drawing data $D_{B2}$ are outputted each time the relative coordinate region is reset.

When the stylus 40 is removed from the liquid crystal display screen, the completion of the input is detected and this result is outputted from the XY coordinates data detecting circuit 142, whereby a YES is outputted in step SP7. Then, the processing proceeds to step SP8, whereat the routine is ended.

As described above, the coordinates data converting circuit 143 can allow the hand-written line drawing to be displayed on the display screen of the display apparatus 19 by outputting the picture drawing data $D_{B2}$ to the latter. The coordinates data converting circuit 143 also supplies the picture drawing data $D_{B2}$ to a picture drawing data transmitting circuit 146 (FIG. 8) of the control apparatus 12, via the display apparatus 19. Thus, the user can transmit a line drawing to the transmission receiving apparatus while he or she is confirming the same line drawing.

Further, in the tablet input display apparatus 15 of FIG. 8, the picture drawing data $D_{B1}$ inputted from the transmission receiving apparatus are supplied through the display apparatus 19 to a liquid crystal display apparatus 144 together with the picture drawing data $D_{B2}$ sent from the coordinates data converting circuit 143. Thus, the line drawings expressed by the picture drawing data $D_{B1}$ and $D_{B2}$ are both displayed, on the display screen located on the tablet 39.

More specifically, when the picture drawing data $D_{B1}$ or $D_{B2}$ are supplied to the liquid crystal display apparatus 144, the display conditions of the liquid crystal display elements, forming the display screen are sequentially changed from a white display condition to a black display condition on the basis of the above-mentioned picture drawing data $D_{B1}$ or $D_{B2}$ thereby forming the displayed images of the line drawings.

If the line drawing data $D_{B2}$ are inputted to the liquid crystal display apparatus 144 while it is displaying the image of the picture drawing data $D_{B1}$, for example, the picture drawing data $D_{B2}$ are temporarily stored in a memory circuit and the picture drawing data $D_{B2}$ are then processed after the processing of the picture drawing data $D_{B1}$ is completed.

Since according to the embodiment of FIG. 8, the amount of the picture drawing data $D_{B1}$ and $D_{B2}$ can be reduced, the time required by the liquid crystal display apparatus 144 to process the picture drawing data $D_{B1}$ and $D_{B2}$ is similarly reduced. Thus, following the scanning by the stylus 40, the tablet input display apparatus 15 can display the locus drawn by the stylus 40.

If the tablet input display apparatus 15 is of a type in which the locus of the stylus 40 is displayed with a delay time from the actual drawing by the stylus 40, the user feels uneasy operating the stylus 40, as compared to drawing with a writing utensil. Accordingly, if the locus of the stylus 40 is rapidly displayed, as in the embodiment of FIG. 8, then the user can input the picture drawing data as if the user was drawing with an ordinary pen. Therefore, the picture communication apparatus 10 can be utilized more efficiently.

Further, in the embodiment of FIG. 8, the picture drawing data $D_{B2}$ are formed in units of relative coordinates regions, and the picture drawing data $D_{B1}$ and $D_{B2}$ are alternately processed. Thus, if a written picture signal is transmitted together with a signal from the transmission receiving apparatus, the display images of the picture drawing data $D_{B1}$ and $D_{B2}$ are alternately formed in a short processing time at each instance the stylus 40 is displaced from the relative coordinates regions. Therefore, the user can add the picture drawing data as if the user had drawn on a sheet of paper together with the display image from the transmission receiving apparatus. Thus, the picture communication apparatus 10 can be utilized more efficiently.

The display apparatus 19 in the embodiment of FIG. 8 is adapted to display the video signal which is derived from the control apparatus 12 in response to the mode switching operation of the control apparatus 12.

More specifically, in the local mode and in the television communication mode, the display apparatus 19 displays a picture corresponding to the video signal derived from the control apparatus 12. However, in the tele-writing mode, the display apparatus 19 forms and displays an image in response to the picture drawing data $D_{B1}$ and $D_{B2}$ inputted thereto from the control apparatus 12 and the tablet input display apparatus 15. The display operation of the display apparatus 19 will be described hereinbelow with reference to FIG. 8, in which in the display apparatus 19, the picture drawing data $D_{B1}$, derived from a picture drawing data receiving circuit 149, and the picture drawing data $D_{B2}$ are supplied to a picture drawing data control circuit 150.

The picture drawing data control circuit 150 outputs either the picture drawing data $D_{B1}$ or $D_{B2}$, whichever comes first, to a picture drawing data demodulating circuit 151. Further, the picture drawing data control circuit 150 is adapted to temporarily store in a memory circuit (not shown) the second received picture drawing data $D_{B1}$ or $D_{B2}$ until the processing of the first picture drawing data $D_{B1}$ or $D_{B2}$, derived from the picture drawing data demodulating circuit 151, is completed.

The picture drawing data demodulating circuit 151, which may be comprised of a suitable central processing unit (CPU), is adapted to renew the display data stored in a video memory circuit 153 on the basis of the picture drawing data $D_{B1}$ and $D_{B2}$.

Accordingly, in this embodiment, the amount of the picture drawing data $D_{B1}$ or $D_{B2}$ can be reduced so that the data processing time of the picture drawing data demodulating circuit 151 can be reduced. Therefore, even if the picture drawing data $D_{B1}$ or $D_{B2}$ derived from the tablet input display apparatus 15 and the control apparatus 12, are processed in units of picture drawing data, it is possible to form the display data in a short period of time.

A video memory display circuit 154 sequentially reads the display data which are stored in the video memory circuit 153 and which form the video signal, and displays this video signal on a cathode ray tube 155.

Accordingly, the processing time for the picture drawing data demodulating circuit 151 can be reduced. The picture drawing data $D_{B2}$ can be formed in units of relative coordinates regions, and the picture drawing data $D_{B1}$ and $D_{B2}$ are alternately processed. Accordingly, if the line drawing signal is added to the signal from the transmission receiving apparatus, each time the stylus 40 is displaced from the relative coordinates region, the display images of the picture drawing data $D_{B1}$ and $D_{B2}$ are alternately formed in a short processing time, in a manner similar to that described for the liquid crystal display apparatus 144.

Therefore, the user can display the picture drawing data as if the user had drawn on a sheet of paper together with the display image from the transmission receiving apparatus. Thus, the picture communication apparatus 10 can be utilized more effectively.

Further, in response to the control signal from the control apparatus 12, the display apparatus 19 displays the video signal derived from the video memory display circuit 154 in a superimposed fashion upon the video signal derived from the control apparatus 12. Therefore, the picture communication apparatus 10 can be utilized more efficiently.

More specifically, the display apparatus 19 forms a key signal on the basis of the video signal generated from the picture drawing data $D_{B1}$ and $D_{B2}$. On the basis of this key signal, the display apparatus 19 displays the line drawing on the display screen in a superimposed fashion upon the picture corresponding to the video signal derived from the control apparatus 12.

Therefore, the user can transmit pick up drawings, maps and the like, for example, and can add the line drawing onto the displayed image, whereby the transmission process of the line drawing can be improved as compared with the prior art.

Figure 12:
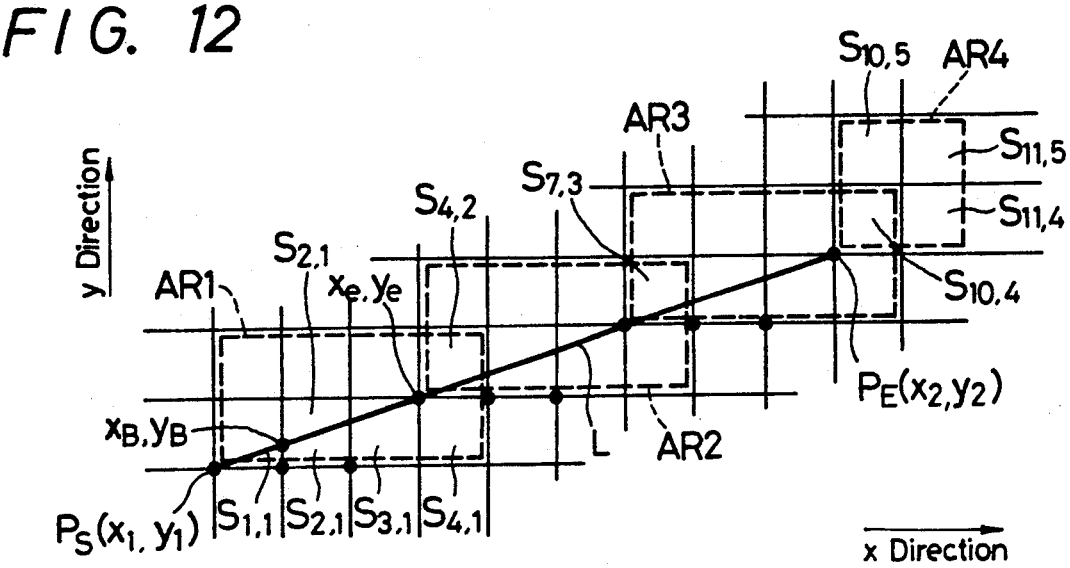
FIG. 12 is a schematic diagram for explaining the operation of coordinates conversion of the tablet means of FIG. 5.
Figure 13:
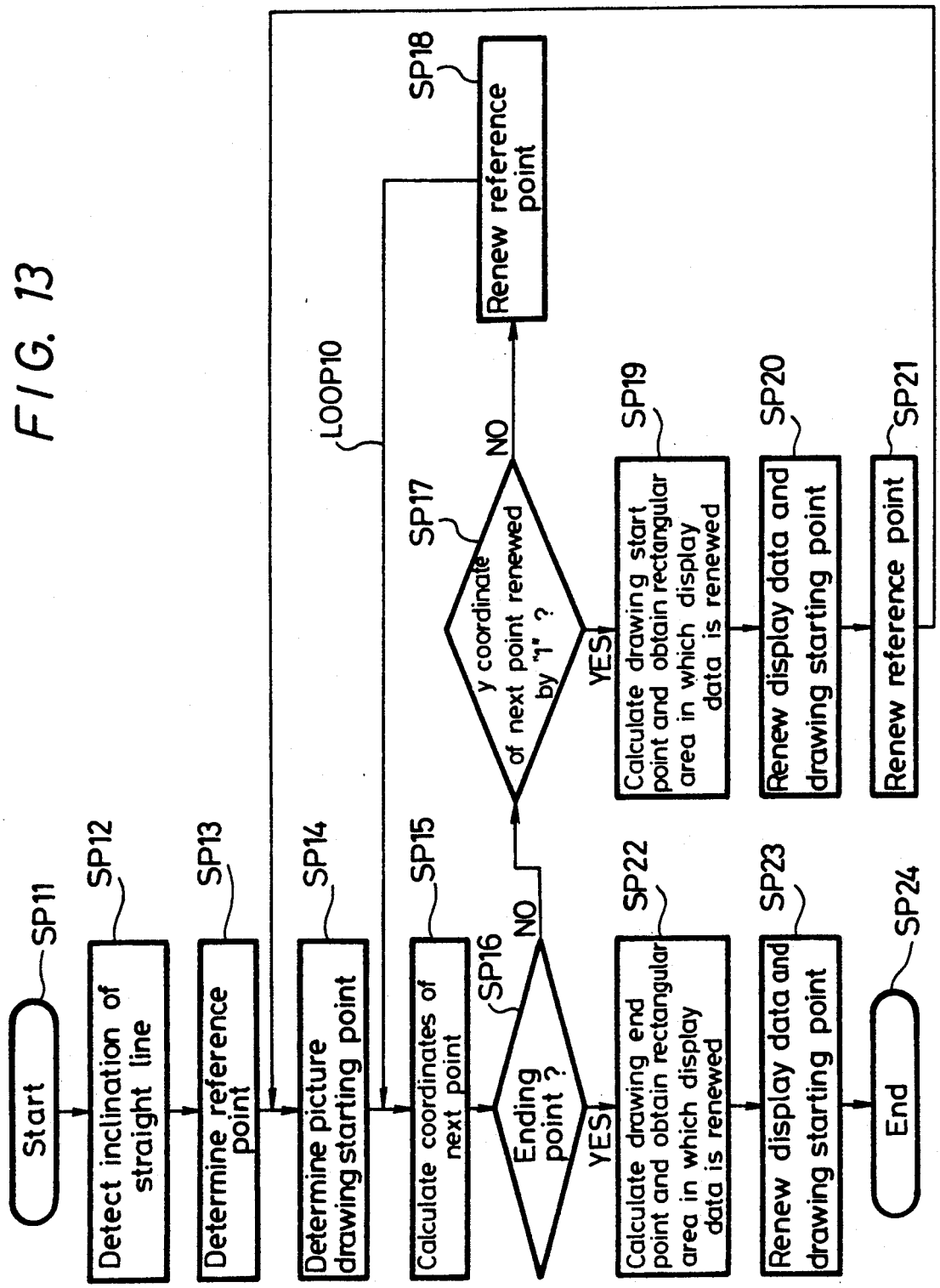
FIG. 13 is a flow chart to which reference will be made in explaining the operation of tablet means of FIG. 5.

With reference to FIGS. 12 and 13, a process will now be explained in which the display data of the video memory are renewed on the basis of the detected coordinates data, and a straight line L having a predetermined width (see FIG. 12) is displayed.

As shown in FIG. 13, following the Start of the operation in start step SP11, the processing proceeds to step SP12. In step SP12, coordinates data $x_1$, $y_1$ and $x_2$, $y_2$, representing the starting and ending points $P_S$ and $P_E$ of the straight line L, respectively, are derived from the picture drawing data demodulating circuit 151 (see FIG. 8), for example. Then, on the basis of the coordinates data $x_1$, $y_1$ and $x_2$, $y_2$, a calculation corresponding to the following equation (1)

$$\frac{dy}{dx} = \frac{y_2 - y_1}{x_2 - x_1} \quad (1)$$

is executed to detect the inclination of the straight line L.

Then, the processing proceeds to step SP13, whereat the coordinates data $D_{XY}$ of the corresponding pixel $S_{1,1}$ are derived from the coordinates data $x_1$ and $y_1$ of the starting point $P_s$, and the coordinates data $D_{xy}$ are stored in a coordinates data memory circuit 157 (see FIG. 8). Then, coordinates data $x_A$ and $y_A$ of a reference point, respectively expressed by the following equations (2) and (3)

$$x_A = x_1 \quad (2)$$

$$y_A = y_1 \quad (3)$$

are determined as the coordinates data $x_1$ and $y_1$ of the starting point $P_s$.

The processing of the coordinates data detecting circuit 156 (see FIG. 8) proceeds to step SP14. In step SP14, coordinates data $x_s$ and $y_s$, which are respectively expressed by the following equations (4) and (5), represent the picture drawing starting point and are set to the coordinates data $x_A$ and $y_A$ of the reference point:

$$x_s = x_A \quad (4)$$

$$y_s = y_A \quad (5)$$

Then, the adjacent pixel $S_{2,1}$, through which the straight line L passes, is detected on the basis of the coordinates data $x_s$ and yS of the picture drawing starting point In step SP15, the coordinates data detecting circuit 156 executes the calculations corresponding to the following equations (6) and (7) in order to determine the coordinates of the next point on the straight line L:

$$x_B = x_A + 1 \quad (6)$$

$$y_B = y_A + \frac{dy}{ds} \quad (7)$$

Thus, coordinate data $x_B$ incremented in the x direction by one pixel amount, is obtained, and the coordinate data $y_B$, which corresponds to this point in the y direction is detected.

The routine proceeds to the next step SP16, whereat it is determined whether or not the following equation (8) is satisfied:

$$x_B = x_2 \tag{8}$$

More specifically, it is determined whether or not the coordinate data $x_B$ of the new reference point coincides with the coordinate data $x_2$ of the ending point.

If the new reference point does not coincide with the ending point, as in the case in FIG. 12, a NO is outputted at step SP16, and then the processing of the coordinates data detecting circuit 156 proceeds to step SP17. In step SP17, it is determined whether or not the following equation (9) is satisfied:

$$Y_B \geq y_A + 1 \tag{9}$$

In this case, a NO is outputted at step SP17 because the y coordinate of the next point, where the straight line L passes through the adjacent pixel $S_{2,1}$ (see FIG. 12), has not been incremented by one pixel amount from the reference point. Then, the processing of the coordinates data detecting circuit 156 proceeds to step SP18.

In step SP18, the coordinates data detecting circuit 156 executes the calculation expressed by the following equation (10) in order to determine the coordinates data of the new reference point:

$$x_A = X_A + 1 \tag{10}$$

In executing step SP18, the coordinate data $x_A$ in the x direction is renewed to the coordinate data $x_B$ of the next point obtained at step SP15. Then, the processing returns to step SP15, whereat coordinate data $x_B$, incrementing in the x direction by one pixel amount, is obtained on the basis of the renewed reference point, and coordinate data $Y_B$, which corresponds to this point in the y direction, is detected.

As described above, when a processing loop LOOP10 comprised of sequential steps SP15, SP16, SP17 and SP18 is repeatedly performed, the coordinates data of the straight line L are sequentially renewed in the x direction by one pixel amount on the basis of the picture drawing starting point. Thus, the coordinate data $y_B$, which corresponds to the renewed coordinate data in the y direction, can be detected.

If, however, a YES is outputted at step SP17, indicating that the coordinate data $y_B$ in the y direction has been incremented by more than one pixel amount above the coordinates data of the picture drawing starting point then the pixel through which the straight line L passes has been changed from one to another of the pixels $S_{1,1}$, $S_2$, 1, $S_{3,1}$, successively in the x direction, to a pixel $S_{4,2}$ which is incremented in the y direction by one pixel amount. Then, the processing of the coordinates data detecting circuit 156 proceeds to step SP19. In step SP19, the new drawing start point, which is based on the coordinates data $x_A$ and $y_A$, is determined to be the picture drawing ending point, as is expressed by the following equations (11) and (12):

$$x_c = x_A + dx_L \tag{11}$$

$$y_c = y_A + dy_L \tag{12}$$

According to the above-mentioned calculation, a rectangular area AR1 is detected, in which the perimeter of the rectangular area is extended in the x direction and in the y direction by the values $dx_L$ and $dy_L$, respectively.

The values $dx_L$ and $dy_L$ are determined on the basis of the control data pixels $S_{1,1}$, $S_{2,1}$ and $S_{3,1}$, and are used to form the straight line L, whose width corresponds to 2 pixels.

The processing by the coordinates data detecting circuit 156 proceeds to step SP20. On the basis of the coordinates data of the initial picture drawing starting point, which are stored in the coordinates data memory circuit 157 (FIG. 8) the display data corresponding to the pixels $S_{1,1}$, $S_{2,1}$, $S_{3,1}$, $S_{4,1}$, $S_{1,2}$, $S_{2,2}$, $S_{3,2}$ and $S_{4,2}$ which comprise the rectangular area AR1 and are stored in the video memory circuit 153, are renewed from display data representing white to display data representing black. Then, the routine proceeds to step SP21.

As described above, in the embodiment of FIG. 8, when the display data are renewed, the pixels which are continuous in the x direction are renewed simultaneously.

In practice, in the video memory circuit 153, the video signal is formed by sequentially reading display data of adjacent pixels. Therefore, when the display data are renewed, if the pixels which are continuous in the x direction are renewed simultaneously, in contrast to the case where the display data are renewed in units of logic pixels, then the time necessary for forming the display image can be reduced.

Thus, if the display data are comprised of pixels which are continuous in the x direction and are renewed simultaneously, the display data can be renewed more efficiently than in the prior art. Specifically, when the display data are renewed in units of logic pixels, as in the prior art, display data are renewed twice for each of the pixels $S_{2,1}$, $S_{3,1}$, $S_{2,2}$ and $S_{3,2}$, whereas, according to this embodiment of the invention, the display data are renewed only one time for each of the pixels $S_{2,1}$, $S_{3,1}$, $S_{2,2}$ and $S_{3,2}$. Therefore, the unnecessary and repeated renewals of the display data in the prior art can be minimized. Hence, the time necessary for forming the display image can be further reduced.

In step SP21, the coordinates data detecting circuit 156 renews the reference point by executing the calculation expressed by the following equations (13) and (14):

$$x_A = x_B \tag{13}$$

$$Y_A = Y_B \tag{14}$$

Then, the processing returns to step SP14, and the processing loop LOOP10, comprised of steps SP15, SP16, SP17 and SP18 is repeated.

Thus, when the processing loop LOOP10 is repeated, subsequent to determination of the rectangular area AR1, rectangular areas AR2 and AR3 are sequentially detected, and display data are renewed for pixels $S_{4,2}$, . . ., $S_{7,3}$ and $S_{7,3}$, . . ., $S_{10,4}$.

If it is determined that the coordinate data $x_B$ of the next point in the x direction coincides with the coordinate data $x_2$ of the ending point $P_E$, this indicates that the rectangular areas AR1, AR2 and AR3 are sequentially detected so that the next point reaches the ending point of the coordinates data of the straight line L. Once the ending point has been reached, as represented by a YES at step SP16, then the processing by the coordinates data detecting circuit 156 proceeds to the next step SP22. In step SP22, the coordinates data of the next point are determined to be the coordinates data of the picture drawing ending point, and calculations according to the following equations (15) and (16) are performed:

$$x_c = x_A + dx_L \quad (15)$$

$$Y_c = Y_A + dy_L \quad (16)$$

Thus, a rectangular area AR4 is detected on the basis of the data identifying the new picture drawing starting point and the picture drawing ending point (in the example of FIG. 12, the new picture drawing starting point and the picture drawing ending point are coincident with each other).

In the next step SP23, display data are renewed for the pixels $S_{10,4}$, $S_{11,4}$, $S_{10,5}$ and $S_{11,5}$ which comprise the rectangular area AR4, and the processing proceeds to end step SP24, whereat the routine is ended.

Accordingly, in the video memory circuit 153, the display images, provided in response to the picture drawing data $D_{B1}$ and $D_{B2}$, are sequentially formed in a short period of time whereby a black line drawing expressed by the picture drawing data $D_{B1}$ and $D_{B2}$ is displayed on the white background of the display screen of the cathode ray tube 155.

As described above, the time for forming a display image can be reduced so that even when the picture drawing data $D_{B1}$ and $D_{B2}$ are alternately and sequentially supplied thereby renewing the display data, the display data $D_{B1}$ and $B_{B2}$ can be processed in a short period of time. Therefore, users can communicate with each other as though they were making a drawing on a sheet of paper, for example. Thus, the picture communication apparatus 10 can be utilized more efficiently, and the exclusive digital network line L2 can be utilized more effectively.

It will be appreciated from the above that, in the embodiment of FIG. 8, the picture drawing data demodulating circuit 151, the coordinates data detecting circuit 156 and the coordinates data memory circuit 157 constitute pixel detecting means for detecting, on the basis of the picture drawing data $D_{B1}$ and $D_{B2}$, the pixels, $S_{1,1}$, $S_{2,1}$, $S_{3,1}$, ..., $S_{10,4}$ through which passes the line drawing $L_1$ expressed by the picture drawing data $D_{B1}$ and $D_{B2}$. Simultaneously, the circuits 151, 156 and 157 constitute display data renewing means for sequentially renewing display data which are stored in the video memory circuit 153 on the basis of the pixels $S_{1,1}$, $S_{2,1}$, $S_{3,1}$ ... $S_{10,4}$, and which are in units of pixels ($S_{1,1}$, $S_{2,1}$, $S_{3,1}$, $S_{4,1}$, $S_{1,2}$, $S_{2,2}$, $S_{3,2}$, $S_{4,2}$), ($S_{4,2}$, $S_{5,2}$, $S_{6,2}$, $S_{7,2}$, $S_{4,3}$, $S_{5,3}$, $S_{6,3}$, $S_{7,3}$).

Further, the video memory display circuit 154 constitutes a video memory control circuit which sequentially reads the display data stored in the video memory circuit 153.

In response to a control signal from the control apparatus 12, the display apparatus 19 of FIG. 8 displays the line drawing corresponding to the video signal $S_{V3}$, derived from the video memory display circuit 154, in a superimposed fashion upon the display image corresponding to the video signal derived from the control apparatus 12.

More specifically, in the display apparatus 19 of FIG. 8, a key signal is formed on the basis of the video signal $S_{V3}$, which is comprised of the picture drawing data $D_{B1}$ and $D_{B2}$. On the basis of this key signal, the line drawing can be superimposed upon the displayed image of the video signal derived from the control apparatus 12. Therefore, the user can take a picture of a drawing, map or the like, for example, and can add the line drawing onto the display screen, whereby the transmission process of the line drawing can be further improved over the prior art.

Another embodiment of the invention will now be described with reference to FIG. 14, which depicts a method of setting the display mode in a picture communication apparatus having the above described tablet and which is embodied in a television telephone apparatus.

Figure 14:
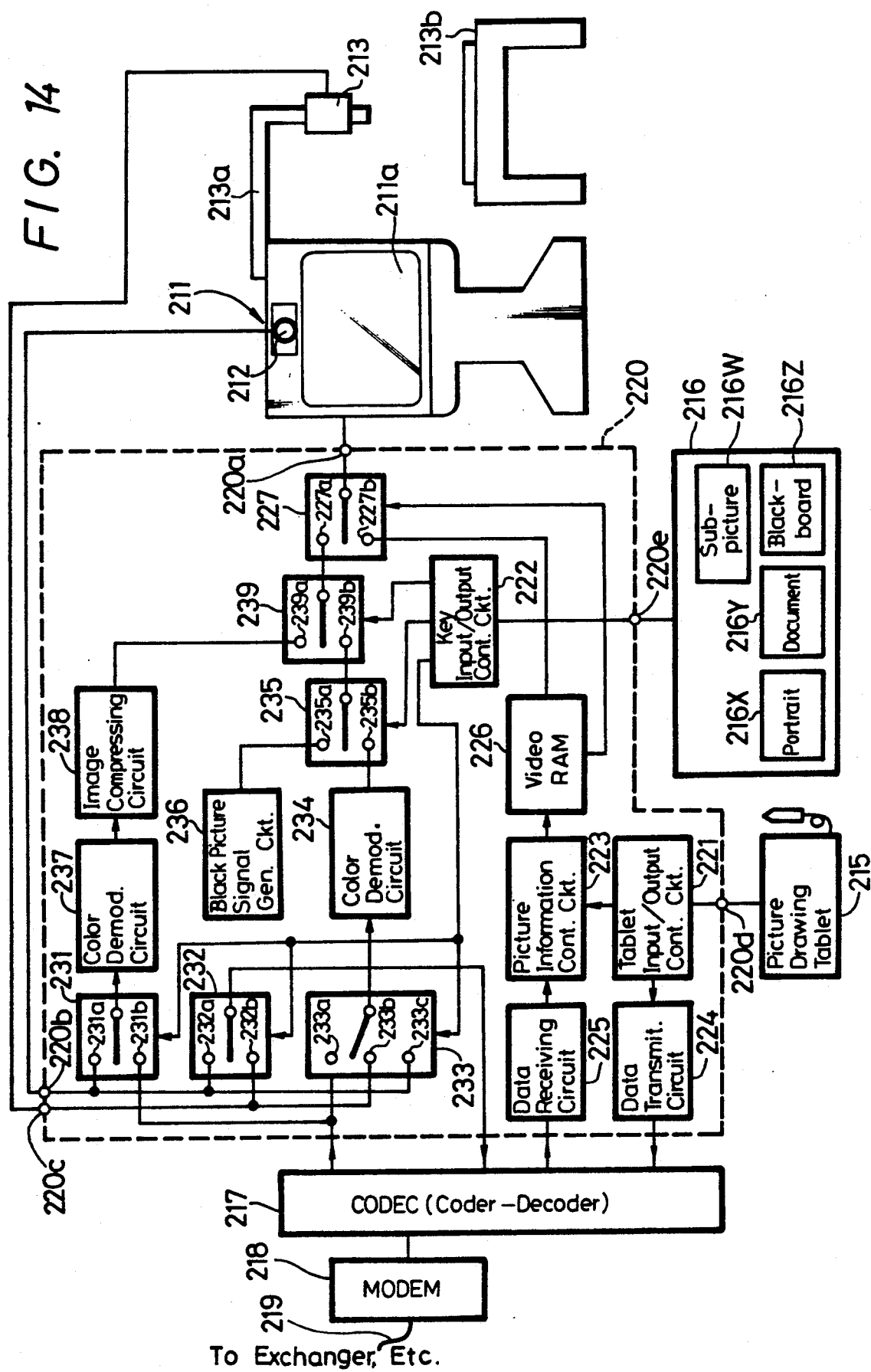
FIG. 14 is a block diagram of the two-way communication system according to a further embodiment of this invention.

As shown in FIG. 14, a television camera 212 for taking a picture of the operator (hereinafter referred to as a portrait camera) is located above the central portion of a display screen 211a of a display monitor 211, such as a cathode ray tube (CRT) display monitor or the like. In addition a television camera 213 for taking a picture of a line drawing (hereinafter referred to as a document television camera) is secured to the display monitor 211 via a support arm 213a attached to the top of the housing of the display monitor 211, or the like A document table 213b is placed opposite to the document television camera 213. A picture of an original document placed on the document table 213b is taken by the document camera 213 The portrait camera 212 is used to take a picture of a user who is seated in front of the display monitor 211

The display monitor 211 is supplied with a video signal from a video signal output terminal 220a of a controller 220. Transmitted output signals from the portrait television camera 212 and the document television camera 213 are supplied to signal input terminals 220b and 220c of the controller 220. A picture drawing tablet 215, provided as picture drawing input means, is connected through a picture drawing information input/output terminal 220d of the controller 220 to a tablet input/output control circuit 221. A keyboard 216, provided as key input means, is connected through a keyboard connection terminal 220e of the controller 220 to a key input/output control circuit 222. The keyboard 216 is minimally provided with mode change-over keys, such as a sub-picture key 216W, an operator key 216X, a document key 216Y and a blackboard key 216Z.

Picture drawing information, which is derived from the tablet input/output control circuit 221 each time the tablet 215 is used to draw a picture or the like, is supplied to a picture drawing information control circuit 223, and is supplied through a data transmitting circuit 224 to a CODEC (coder-decoder) 217. The picture drawing information control circuit 223 is supplied with incoming picture drawing information, which is sent from a user at another station, and is supplied from the CODEC 217 through a data receiving circuit 225. The picture information control circuit 223 is adapted to mix the incoming picture drawing information and the picture drawing information from the tablet input/output control circuit 221, and to supply a mixed output to a video RAM 226 which is provided as video signal memory means. Picture drawing information display signals (for example, the three primary color signals R, G and B) from the video RAM 226 are supplied to a fixed contact 227b of a superimpose high-speed change-over switch 227. The position of the high-speed change over switch 227 is changed by a switching control signal from the video RAM 226, for example. This switching control signal can be provided by waveform-shaping the sum of the three primary color signals R, G and B, for example. When any one of the three primary color signals R, G and B is not zero, the switching control signal goes to high level "H" and connects the change over switch 227 to the fixed contact 227b. The change-over switch 227 is supplied at its fixed contact 227a with a video signal which indicates that an inset picture (sub-picture) is displayed within an operator or document picture (main picture). This video signal supplied to the contact 227a can be comprised of the red, green and blue three primary color signals, R, G and B, respectively. While in the normal mode, this video signal is supplied through the change-over switch 227 and the video signal output terminal 220a to the display monitor 211. However, when the picture drawing information exists (not one of the three primary color signals R, G and B is zero), and a display signal of the picture drawing information read from the video RAM 226 is supplied through the change-over switch 227 and the terminal 220a to the display monitor 211. Thus, the content of the picture drawing information is superimposed upon the picture corresponding to the above-described video signal.

A video signal supplied to the input terminal 220b from the television camera 212 is supplied to a fixed contact 231a of a change-over switch 231, a fixed contact 232a of a change-over switch 232 and a fixed contact 233c of a change-over switch 233. A video signal supplied from the television camera 213 through the input terminal 220c is supplied to a fixed contact 232b of the change-over switch 232 and a fixed contact 233b of the change-over switch 233. The incoming video signal from the CODEC 217 is supplied to the fixed contact 231b of the change-over switch 231 and the fixed contact 233a of the change-over switch 233, whereas the video signal from the change-over switch 232 is supplied to the CODEC 217. The video signal from the change-over switch 233 is supplied to a color demodulating circuit 234, in which it is demodulated in color to provide the red, green and blue three primary color signals, R, G and B, for example. These three primary color signals, R, G and B, are supplied to a fixed contact 235b of a change-over switch 235. The change-over switch 235 is supplied at its fixed contact 235a with a black picture signal from a black picture signal generating circuit 236. The black picture signal is used to display a black background (blackboard) in a blackboard mode as later described. The video signal from the change-over switch 235 is supplied to a fixed contact 239b of a change-over switch 239. The video signal from the change-over switch 231 is supplied in color to a color demodulating circuit 237, in which it is demodulated to provide a color video signal. This color video signal is supplied to an image compressing circuit 238, in which it is compressed in order to provide and inset picture display signal. This inset picture display signal is supplied to the fixed contact 239a of the change-over switch 239. The change-over switch 239 generates a video signal of a "picture-in-picture" type, in which the video signal supplied to the fixed contact 239a is inserted into the video signal supplied to the fixed contact 239b.

Figure 15:
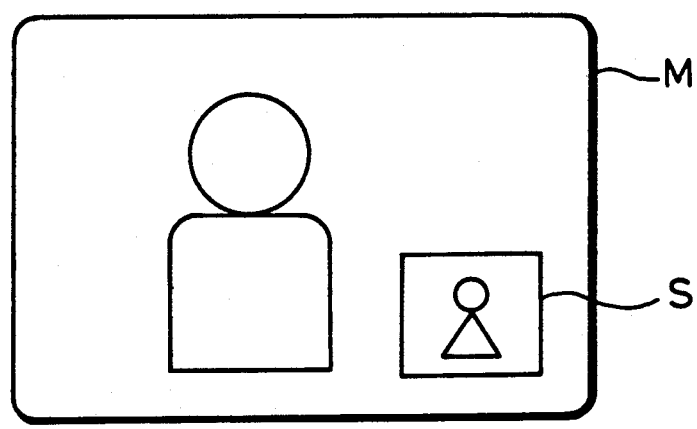
FIG. 15 is a schematic diagram for explaining the operation of display means of apparatus of FIG. 14.

As shown in FIG. 15, the change-over switch 239 generates a video signal for displaying a picture in which an inset picture (sub-picture) S, supplied by the image compressing circuit 238, is inserted into a portion of a whole picture (main picture) M, on which the video signal supplied by the change-over switch 235 is displayed.

The video signal from the change-over switch 239 is supplied to the fixed contact 227a of the change-over switch 227, wherein the picture drawing information from the fixed contact 227b is superimposed upon this video signal, if desired. The video signal from the change-over switch 227 is supplied through the video signal output terminal 220a to the display monitor 211. The change-over switches 231, 232, 233, 235 and 239 are respectively changed in position by the switching control signals from the key input/output control circuit 222. The CODEC 217 is connected through a MODEM (modulator-demodulator) 218 to a network line 219, such as a digital telephone network line, and the like.

The above-mentioned image compressing circuit 23 will now be described with reference to FIG. 16.

Figure 16:
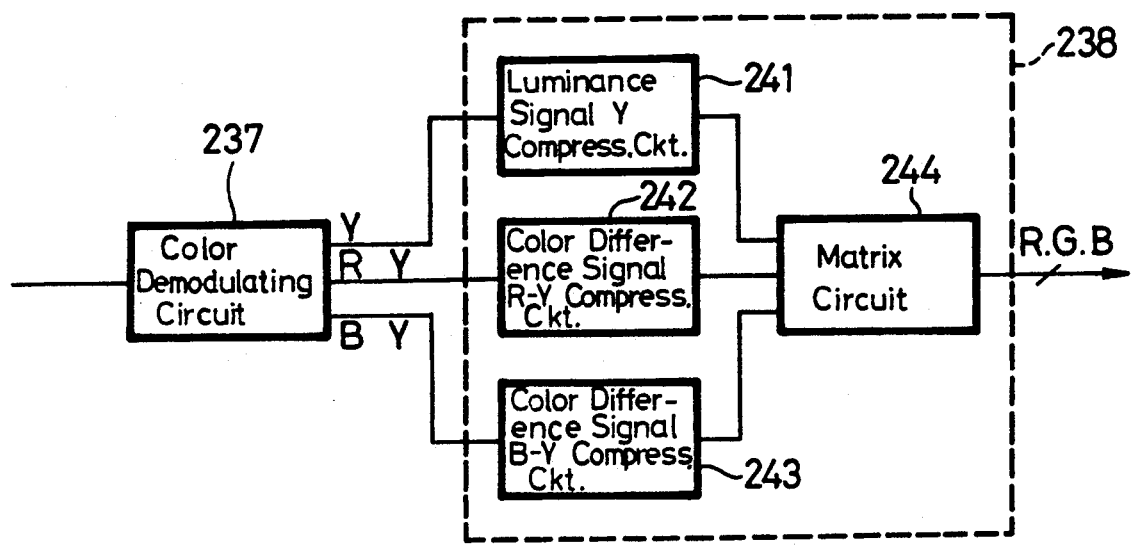
FIG. 16 is a block diagram of picture compression means of FIG. 14.

In the image compressing circuit 238, as shown in FIG. 16, a luminance signal Y and two color difference signals, R-Y and B-Y from the color demodulating circuit 237, are respectively supplied to compressing circuits 241, 242 and 243 in which the signals are image-compressed by thinning them in the horizontal and vertical directions. Then, the image-compressed signals are supplied to a matrix circuit 244, in which they are converted to the red, green and blue three primary color signals, R, G and B.

In the television telephone apparatus of FIG. 14, when the key 216X of the keyboard 216 is turned ON, the key input/output control circuit 222 controls the change-over switches 231, 232 and 233 so that they are connected to their respective fixed contacts 231a, 232a and 233a. Simultaneously, the change-over switch 235 is connected to the fixed contact 235b. Accordingly, the video signal from the television camera 212 is supplied through the change-over switch 231 to the color demodulating circuit 237, and through the change-over switch 232 to the CODEC 217. The incoming video signal from the CODEC 217 is supplied through the change-over switch 233 to the color demodulating circuit 234, whereby it is demodulated. The demodulated signal is supplied through the change-over switches 35, 239 and 227 to the display monitor 211. Accordingly, the display monitor 211 displays the image of the incoming video signal on the main picture screen M of FIG. 15, and also displays a visual image of a picture, such as, the user's visual image or portrait taken by the television camera 212, and which appears on the sub-picture screen S which forms a small portion of the main picture screen. This portrait visual image is transmitted to and is displayed on the main picture screen of the display monitor of the other party.

When the key 216Y of the keyboard 216 is turned ON, the key input/output control circuit 222 controls the change-over switches 231, 232 and 233 so that they are connected to their respective fixed contacts 231b, 232b, and 233b. Thus, the incoming video signal is supplied through the change-over switch 231 to the color demodulating circuit 237. The video signal from the document television camera 213 is supplied through the change-over switch 232 to the CODEC 217, and through the change-over switch 233 to the color demodulating circuit 234. Therefore, a visual image of the document picked up by the television camera 213 is displayed on the monitor 211 and the display monitor of the other party, whereas a portrait visual image of the other party is displayed on the inset screen of the display monitor 211.

Further, when the television telephone apparatus is set in the document mode by the television telephone apparatus of the other party, the change-over switches 231, 232 and 233 are all connected to their respective fixed contacts 231a, 232a and 233a. Thus, the incoming visual image of the document is displayed on the main picture screen of the display monitor 211, and the portrait visual images are displayed on the inset screens of the display monitor of the user and of the display monitor of the other party, respectively. The incoming visual image of the document is displayed on the main picture screen of the display monitor of the other party.

When the portrait or document display mode is selected and the picture drawing information is inputted to the television telephone apparatus embodying this invention through the use of the picture drawing tablet 215, the picture drawing information (i.e., the data signal) is supplied to the CODEC 217 from the tablet input/output control circuit 221 through the data transmitting circuit 224. This picture drawing information is mixed with the incoming picture drawing information by the picture drawing information control circuit 223, and is written in the video RAM 226. The video signal from the video RAM 226 is superimposed upon the above-mentioned video signal by the change-over switch 227, and is supplied to the display monitor 211. Consequently, the displayed document can be marked with underlines, check marks or the like, applied at the tablet 215.

The blackboard key 216Z of the keyboard 216 must be turned ON in order to display the image of a video signal representing a portrait, a hand-written memorandum or the like, independently of the document.

More specifically, when the blackboard mode is selected by turning the blackboard key 216Z ON, the key input/output control circuit 222 controls the change-over switch 235 so that it is connected to the fixed contact 235a, whereby the black picture signal from the black picture signal generating circuit 236 is supplied to the fixed contact 227a of the change-over switch 227. Simultaneously, the key input/output control circuit 222 controls the change-over switch 239 so that the latter is connected to the fixed contact 227b in order to stop the display of the inset. Consequently, the entire background is displayed in black, which corresponds to a blackboard, and only the picture drawing information will be displayed on the display monitor 211. The color of the background is not limited to black and can be freely selected. However, the selected color should be distinguishable from the picture drawing information.

If the inset-picture mode is selected by turning the inset-picture key 216W ON while the blackboard mode is selected, the key input/output control circuit 222 controls the change-over switch 231 so that it is connected to the fixed contact 231a. Simultaneously, the key input/output control circuit 222 controls the change-over switch 239 so that the latter generates a video signal for displaying the inset-picture in the picture-in-picture fashion. Thus, a visual image based on the incoming video signal is compressed and displayed on the display monitor 211 at the portion of the main picture screen on which the black background is displayed.

Therefore, the television telephone apparatus according to the present invention, in the portrait display mode or in the document display mode, the picture drawing information supplied by the tablet 215 is superimposed onto the displayed image, whereby the document image displayed on the display monitor 211, for example, can be marked with underlines, check marks and the like. In addition, when a single hand-written memorandum or the like is displayed, the solid background color enables the user to see the picture drawing content clearly. Further, when the inset or sub-picture mode is selected while the picture drawing information is displayed in the blackboard mode, the portrait of the other party or the like can be displayed on the inset-picture portion of the screen of the display monitor 211 in a picture-in-picture fashion. Thus, it becomes possible for the user to discuss a line drawing or the like while viewing the countenance of the other party.

Although the sub-picture key 216W is effective in the blackboard mode, as described above, the inset-picture can also be displayed or erased by turning the sub-picture key 216W ON or OFF in the portrait display mode or the document display mode. Furthermore, in the television telephone apparatus, which is now commercially available, a still picture mode selecting key is also provided, whereby a still picture of a portrait or a document may be transmitted with high resolution when the still picture mode is selected by turning the still picture mode selecting key ON.

Having described preferred embodiments of the invention in detail with reference to the accompanying drawings, it is to be understood that the invention is not limited to those precise embodiments, and that many changes and modifications could be effected by one skilled in the art without departing from the spirit or scope of the invention as defined in the appended claims.

We claim as our invention

1. In a two-way communication system including first and second communication terminals, telephone means at each terminal for two-way telephone service and picture communication means at each terminal for providing users with visual images of each other, each said picture communication means comprising:

camera means for generating video signals to be transmitted;

display means for displaying the visual images;

control means for controlling transmission and reception of said video signals; and line drawing input means for generating a line drawing signal representing a line drawing and which includes tablet means adapted to have said line drawing drawn thereon by the respective user, coordinates data detecting means for detecting absolute coordinates data in parallel form, coordinates converting means for converting said absolute coordinates data detected by said coordinates data detecting means to relative coordinates data, and parallel-to-serial converting means for outputting the relative coordinates data in serial form to said control means so as to be suitable for transmission with said video signals from said control means.

2. A two-way communication system according to claim 1, wherein said line drawing input means further includes auxiliary display means comprised of liquid crystal devices, a body housing said tablet means and said auxiliary display means, video memory means for storing video data supplied to said auxiliary display means, and means supplied with said relative coordinates data in serial form as the video data to be stored in said video memory means.

3. A two-way communication system according to claim 2, wherein said line drawing input means further includes superimposing means for superimposing the video data stored in said video memory means on said video signal generated by said camera means of one of said first and second communication terminals.

4. A two-way communication system according to claim 2, wherein said coordinates data are X and Y coordinates, and said line drawing input means further includes means for renewing the video data each time one of said X and Y coordinates data changes its level.

5. A two-way communication system according to claim 1, wherein said control means includes mode selecting means for selecting one of a first display mode for displaying said line drawing only on said display means and a second display mode for displaying a superimposed image of said line drawing and the image represented by said video signals on said display means.

6. A two-way communication system according to claim 5, wherein said mode selecting means is further capable of selecting a third display mode for displaying said line drawing on a main display area of said display means and for displaying the image represented by said video signals on a sub display area of said display means.

* * * * *

UNITED STATES PATENT AND TRADEMARK OFFICE
CERTIFICATE OF CORRECTION

PATENT NO. : 5,073,926
DATED : December 17, 1991
INVENTOR(S) : Toshio Suzuki et al.

It is certified that error appears in the above-identified patent and that said Letters Patent is hereby corrected as shown below:

On the Title page, item [73], Assignee should read as follows:

Assignee:

1. Sony Corporation
   7-35 Kitashinagawa 6-chome
   Shinagawa-Ku,
   Tokyo, Japan 2. The Tokyo Electric Power Company, Inc.
   1-3, Uchisaiwai-cho 1-chome,
   Chiyoda-ku,
   Tokyo, Japan 3. Kabushiki Kaisha Meidensha
   1-17, Osaki 2-chome
   Shinagawa-Ku
   Tokyo, Japna 4. Ascii Corporation
   11-5, Minamiaoyama, 5-chome
   Minato-ku
   Tokyo, Japan Signed and Sealed this Sixth Day of April, 1993

Attest:

STEPHEN G. KUNIN

*Attesting Officer*  *Acting Commissioner of Patents and Trademarks*